United States Patent Office 3,703,525
Patented Nov. 21, 1972

3,703,525
TRIAZOLO[1,5-a][1,4]BENZODIAZEPINE DERIVATIVES
Hiroyuki Tawada, Kyoto, and Kanji Meguro and Yutaka Kuwada, Hyogo, Japan, assignors to Takeda Chemical Industries, Ltd., Osaka, Japan
No Drawing. Filed Nov. 16, 1970, Ser. No. 90,139
Claims priority, application Japan, Nov. 15, 1969, 44/91,720
Int. Cl. C07d 53/06, 57/02
U.S. Cl. 260—308 R                    9 Claims

ABSTRACT OF THE DISCLOSURE s-Triazolo [1,5-a][1,4] benzodiazepine derivatives are produced by the following process:

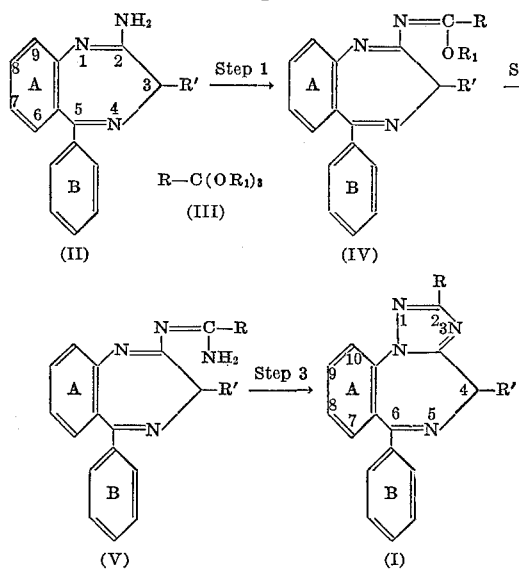

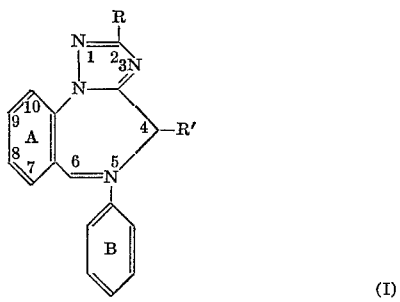

Compounds I, IV and V, 4 or 5 N-oxides thereof and acid salts thereof are active central nervous system agents.

---

This invention relates to novel and useful s-triazolo [1,5-a][1,4] benzodiazepine derivatives of the general formula wherein R is a hydrocarbon residue, R' is hydrogen or lower alkyl, rings A and/or B are unsubstituted or substituted by one or more substituents from halogen, nitro, trifluoromethyl, alkyl or alkoxy, and the nitrogen atom at the 5-position is present as such or is accompanied with an oxygen atom (the 5 N-oxide), and pharmaceutically acceptable salts thereof.

This invention also relates to a novel and useful process for producing the benzodiazepine derivatives (I).

Referring to the general Formula I, as the hydrocarbon residue represented by R, there are mentioned generally alkyl and cycloalkyl, for example of up to about 8 carbon atoms (e.g., methyl, ethyl, propyl, isopropyl, butyl, isobutyl, tert.-butyl, hexyl, cyclohexyl, octyl), aryl, for example mono- and di-cyclic carbocyclic aryl (e.g., phenyl, naphthyl), and aralkyl, for example phenyl lower alkyl (e.g., benzyl, phenethyl). The aromatic ring of the said aryl and aralkyl may be unsubstituted or contain substituent(s), which may be exemplified by alkyl such as lower alkyl (e.g., methyl, ethyl, propyl, isopropyl), alkenyl such as lower alkenyl (e.g., vinyl, 2-propenyl, 2-butenyl), alkoxy such as lower alkoxy (e.g., methoxy, ethoxy, propoxy, isopropoxy), acylamino such as lower alkanoylamino or aroylamino (e.g., acetylamino, benzoylamino), halogen (e.g., chlorine, bromine, fluorine, iodine) or nitro.

The lower alkyl represented by R' is exemplified by methyl, ethyl, propyl, isopropyl, butyl, sec.-butyl, tert.-butyl, amyl, hexyl, etc. Both rings A and B are unsubstituted or substituted by one or more of the same or different substituents from nitro, trifluoromethyl, halogen (e.g., chlorine, fluorine, bromine, iodine), alkyl or cycloalkyl of up to 6 carbon atoms (e.g., methyl, ethyl, propyl, isopropyl, butyl, sec.-butyl, tert.-butyl, pentyl, hexyl, and cyclohexyl) and alkoxy of up to 4 carbon atoms (e.g., methoxy, ethoxy, propoxy, isopropoxy, butoxy, sec.-butoxy, tert.-butoxy).

s-Triazolo [1,5-a][1,4] benzodiazepine derivatives (I) can be produced by the following process:

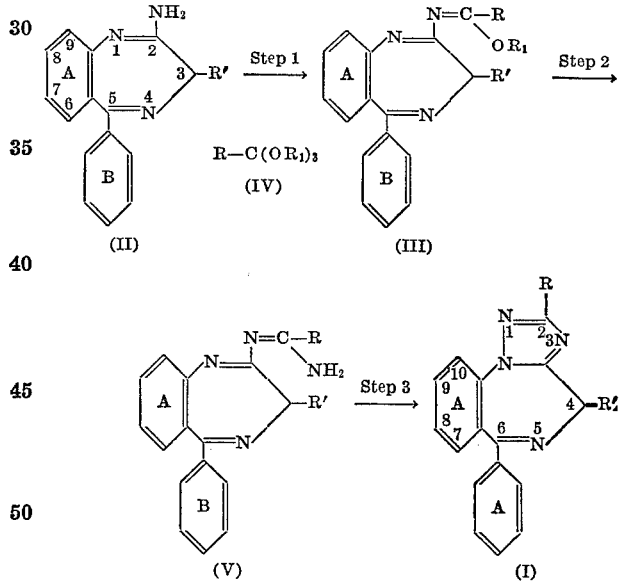

wherein R, R' and rings A and B have the same meaning as hereinbefore defined, $R_1$ is lower alkyl (e.g., methyl, ethyl, propyl) and the nitrogen atom at the 4-position of Formulae II, IV and V and at the 5-position of Formula I is accompanied or unaccompanied with an oxygen atom.

STEP 1

A 2-amino-1,4-benzodiazepine derivative of the general Formula II is reacted with an ortho ester of the general Formula III to produce a 1,4-benzodiazepine of the Formula IV. Generally, the reaction smoothly proceeds on heating at a suitable temperature from about 80° to 200° C. An ortho ester of the Formula III is generally employed in a suitable amount of more than 1 mole, usually 2–10 moles, relative to 1 mole of the starting material of the Formula II. The reaction may be carried out in the presence of a suitable solvent having a high boiling point enough to have the reaction proceed and inert to the Compounds II and III. As the solvent, hydrocarbons such as toluene and xylene may preferably be employed. When the ortho ester is in a form of liquid, the reaction may proceed in the ester itself. The reaction may proceed advantageously in the presence of an acid catalyst (e.g., hydrochloric acid, sulfuric acid, acetic acid). The acid catalyst may be added in a form of an acid addition salt of the Compound II.

STEP 2

Thus obtained, 1,4-benzodiazepine derivative having imido ester residue at the 2-position (IV) is allowed to react with ammonia.

The reaction may generally proceed in the presence of a solvent at a room temperature. If desired, however, the reaction may be carried out on heating or cooling. As a solvent, alcohols (e.g., methanol, ethanol) may preferably be employed.

The above procedure gives 2-(substituted amidino), 1,4-benzodiazepine derivative of the Formula V, which may be isolated in a desired purity by a per se conventional procedure, for example, by distillation, recrystallization, etc.

STEP 3

Thus obtained compound of the Formula V is subjected to the cyclization reaction.

The cyclization reaction is carried out by treating the Compound V with a suitable oxidizing agent. The oxidizing agent may, for example, be lead tetraacetate, a salt of hypohalogenous acid (e.g., sodium or potassium salt of hypochlorous acid and hypobromous acid). The amount of the oxidizing agent employed generally is from 1 to 2 mole equivalent relative to 1 mole of the compound of the general Formula V.

The cyclization reaction may usually be carried out in the presence of a solvent. The solvent is selected depending on the kinds of oxidizing agents and of the Compounds V.

For example, when a salt of hypohalogenous acid is employed, alcohols (e.g., methanol, ethanol) are preferably employable. In case where lead tetraacetate is employed, acetic acid, hydrocarbons (e.g., benzene, toluene) and a mixture thereof are preferably employable. Generally, the cyclization reaction proceeds preferably at a temperature from 0° to 30° C., but if necessary, the reaction is carried out at a tempertaure outside the above range.

Thus prepared s-triazolo [1,5-a] [1,4] benzodiazepine derivative of the Formula I may be isolated in a desired purity by a per se conventional procedure (e.g. recrystallization). The Compound I has basic nitrogen atoms, and therefore may be recovered in a form of a suitable acid salt (e.g. hydrochloride, sulfate). The above series of reactions may be carried out stepwise or at one operation.

In case where the nitrogen atom at the 5-position of the Compound I is accompanied with an oxygen atom, the oxygen atom may be removed, if necessary, by reduction with a suitable deoxygenating agent such as phosphorus trihalide (e.g. phosphorus trichloride), or by catalytic hydrogenation.

The Compound V may be a tautmeric form of the formula

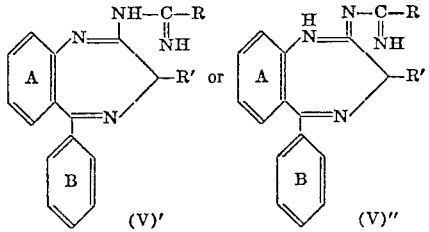

wherein R, R' and rings A and B have the same meaning as hereinbefore defined, respectively and the nitrogen atom at the 4-position is accompanied or unaccompanied with an oxygen atom. These tautomers are also included in the objective compounds of this invention.

In this invention, the starting 2-amino-1,4-benzodiazepine derivative (II) may be prepared by the method of Sternbach, et al. (Journal of Organic Chemistry, 26, 1111 (1961)); or by reacting 2-aminobenzophenone with an alkyl amine, reacting thus produced Schiff's base with aminoacetonitrile, and subsequently subjecting thus obtained 2-amino-α-phenylbenzylidene aminoacetonitrile to a cyclization reaction with an acid or alkali.

The Compounds I, IV and V produced by the method of this invention and acid salts thereof are novel and have remarkable pharmacological effects on central nervous system, such as muscular relaxing, anticonvulsive, sedative and hypnotic effect and are useful as medicaments such as a muscular relaxing agent, an anticonvulsive agent, as tranquilizer and as sleep-inducing agents.

The Compounds I, IV and V and acid salts thereof are employed orally or parenterally as such or, if necessary, mixed with a pharmaceutically acceptable carrier, in a suitable pharmaceutical form such as powder, pellet, tablet, and injection. The administrable amount depends on kinds of compound, conditions of illness and the like, and generally ranges from about 1 to 30 milligrams per day for an adult in oral administration.

The invention will be further illustrated by the following examples, wherein "part(s)" means "part(s) by weight" unless otherwise specified, and the relation between "part(s) by weight" and "part(s) by volume" corresponds to the relation between "gram(s)" and "milliliter(s)."

EXAMPLE 1

A mixture of 2.9 parts of 2-amino-7-chloro-5-phenyl-3H-1,4-benzodiazepine dihydrochloride and 13.7 parts of ethyl orthoacetate is stirred vigorously at 150° C., whereby the crystals are dissolved within 5 minutes. The solvent is distilled off under reduced pressure. After neutralization with aqueous sodium bicarbonate solution, the mixture is extracted with chloroform. The chloroform layer is washed with water and dried over anhydrous sodium sulfate. The solvent is distilled off under reduced pressure, and the residue is dissolved in 50 parts (by volume) of 10% ammoniacal methanol. The solution is kept standing at a room temperature for about 1 hour, followed by the distillation of the solvent. The residue is treated with ethyl acetate-isopropyl ether, whereupon 2-acetoamidino-7 - chloro-5-phenyl-3H-1,4-benzodiazepine is obtained as crystals. Recrystallization from ethyl acetate gives colorless needles, melting at 174°–174.5° C.

*Elementary analysis.*—Calcd. for $C_{17}R_{15}ClN_4$ (percent): C, 65.70; H, 4.87; N, 18.03. Found (percent): C, 65,68; H, 4.80; N, 18.21.

EXAMPLE 2

To a solution of 2 parts of 2-acetoamidino-7-chloro-5-phenyl-3H-1,4-benzodiazepine prepared in Example 1 in 100 parts (by volume) of benzene is added 1.2 parts (by volume) of glacial acetic acid, followed by a gradual addition of 2.9 parts of lead tetraacetate. The mixture is admixed with water after about 20 minutes. Benzene layer is collected. Water layer is further extracted with benzene. Both benzene layers are combined and washed with an aqueous sodium bicarbonate solution and water, and then dried over anhydrous sodium sulfate. The solvent is distilled off and the residue is treated with isopropyl ether, whereupon 8-chloro-2-methyl - 6 - phenyl-4H-s-triazolo-[1,5-a][1,4]benzodiazepine is obtained as crystals. Recrystallization from isopropyl ether or ethyl ether gives colorless prisms, melting at 167°–168° C.

*Elementary analysis.*—Calcd. for $C_{17}H_{13}ClN_4$ (percent): C, 66.13; H, 4.24; N, 18.15. Found (percent): C, 66.10; H, 4.29; N, 18.20.

Picrate: Yellow needles (recrystallization from methanol) melting point: 208°–209° C.

EXAMPLE 3

To a solution of 1.55 part of 2-acetoamidino-7-chloro-5-phenyl-3H-1,4-benzodiazepine obtained in Example 1 in 50 parts (by volume) of methanol, are added 10 parts (by volume) of an aqueous sodium hypochlorite solution (1.75 mole concentration), and the mixture is stirred, whereby crystals separate out. After about 10 minutes water is added and precipitate is collected by filtration and dried, whereupon 8 - chloro-2-methyl-6-phenyl-4H-s-triazolo[1,5-a][1,4]-benzodiazepine is obtained as crystals. Recrystallization from isopropyl ether gives colorless prisms, melting at 167°–168° C.

This product is identical with the product obtained in Example 2.

EXAMPLE 4

A mixture of 3.43 parts of 2-amino-7-chloro-5-phenyl-3H-1,4-benzodiazepine dihydrochloride and 17.6 parts of ethyl orthopropionate is heated at 150° C. for 10 minutes, and then poured into chloroform. The mixture is washed with an aqueous sodium bicarbonate solution and water, and dried over anhydrous sodium sulfate. The solvent is distilled off under reduced pressure and the residue is dissolved in 100 parts (by volume) of 10% ammoniacal methanol. The solution is kept standing at a room temperature for about one hour, followed by distillation of methanol. Trituration with isopropyl ether gives 7-chloro-5 - phenyl - 2 - propionamidino-3H-1,4-benzodiazepine as crystals. Recrystallization from isopropyl ether gives colorless crystals melting at 146°–147° C.

*Elementary analysis.*—Calcd. for $C_{18}H_{17}ClN_4$ (percent): C, 66.56; H, 5.28; N, 17.25. Found (percent): C, 66.73; H, 5.23; N, 17.62.

EXAMPLE 5

To a solution of 1.08 parts of 7-chloro-5-phenyl-2-propionamidino-3H-1,4-benzodiazepine prepared in Example 4 in 60 parts (by volume) of benzene is added 1.5 part of lead tetraacetate gradually. The mixture is stirred for about 10 minutes, followed by addition of water. Benzene layer is treated in the same way as is described in Example 2, whereupon 8-chloro - 2 - ethyl-6-phenyl-4H-s-triazolo-[1,5-a][1,4]benzodiazepine is obtained as crystals. Recrystallization from isopropyl ether-n-hexane gives colorless prisms, melting at 110°–112° C.

*Elementary analysis.*—Calcd. for $C_{18}H_{15}ClN_4$ (percent): C, 66.97; H, 4.68; N, 17.36. Found (percent): C, 67.23; H, 4.71; N, 17.19.

EXAMPLE 6

To a solution of 1.6 part of 7-chloro-5-phenyl-2-propionamidino-3H-1,4-benzodiazepine prepared in Example 4 in 40 parts (by volume) of methanol are added 15 parts (by volume) of an aqueous sodium hypochlorite solution (1.75 mole concentration) dropwise, followed by addition of 40 parts (by volume) of water after about 5 minutes. The mixture is extracted with methylene chloride. The methylene chloride layer is washed with water and dried over anhydrous sodium sulfate, and the solvent is distilled off under reduced pressure. The residue is dissolved in a small amount of ethanol, followed by addition of 0.5 part (by volume) of concentrated sulfuric acid and ether, whereupon oily substance is separated. Ether layer is removed by decantation. The oily substance is treated with ethanol. The resulting crystals are collected by filtration, washed with ether and dried, whereupon 8-chloro-2-ethyl-6-phenyl-4H-s-triazolo[1,5-a][1,4] benzodiazepine sulfate is obtained as crystals.

This sulfate is neutralized with a saturated aqueous sodium bicarbonate solution and extracted with chloroform. Chloroform layer is washed with water and dried over anhydrous sodium sulfate, whereupon 8-chloro-2-ethyl - 6 - phenyl-4H-s-triazolo[1,5-a][1,4]benzodiazepine is obtained as crystals in a free form. Recrystallization from isopropyl ether-n-hexane gives colorless prisms, melting at 110°–112.5° C.

This product is identical with the product obtained in Example 5.

EXAMPLE 7

A mixture of 2.8 parts of 2-amino-7-nitro-5-phenyl-3H-1,4-benzodiazepine and 16 parts of ethyl orthoacetate is heated at 150°–160° C. for about 15 minutes and concentrated under reduced pressure. To the residue are added 100 parts (by volume) of 15% ammoniacal ethanol under ice-cooling and with stirring. After about 20 minutes, the mixture is concentrated under reduced pressure to about half a volume at a temperature of lower than 45° C. Resulting crystals are collected by filtration, whereupon 2-acetoamidino - 7 - nitro - 5 - phenyl-3H-1,4-benzodiazepine is obtained as crystals. Recrystallization from ethyl acetate gives pale yellow needles, melting at 179°–180° C.

*Elementary analysis.*—Calcd. for $C_{17}H_{15}N_5O_2$ (percent): C, 63.54; H, 4.70; N, 21.80. Found (percent): C, 63.59; H, 4.45; N, 21.89.

EXAMPLE 8

To a solution of 1.6 parts of 2-acetoamidino-7-nitro-5-phenyl-3H-1,4-benzodiazepine prepared in Example 7 in 50 parts (by volume) of methanol are added dropwise 10 parts (by volume) of an aqueous sodium hypochlorite solution (1.75 mole concentration) under ice-cooling and with stirring. After stirring for about 15 minutes, the mixture is neutralized with acetic acid and concentrated to about one third volume under reduced pressure, followed by addition of water, whereupon 2-methyl-8-nitro-6-phenyl - 4H - s - triazolo[1,5-a][1,4]benzodiazepine is obtained as crystals. Recrystallization from ethyl acetate gives yellow prisms, melting at 170°–171.5° C.

*Elementary analysis.*—Calcd. for $C_{17}H_{13}N_6O_2$ (percent): C, 63.94; H, 4.10; N, 21.93. Found (percent): C, 64.09; H, 4.00; N, 22.31.

EXAMPLE 9

A mixture of 3.7 parts of 2-amino-7-chloro-5-(p-methoxyphenyl)-3H-1,4 - benzodiazepine dihydrochloride and 16 parts of ethyl orthoacetate is heated at 150°–160° C. for about 5 minutes, followed by distillation of the solvent under reduced pressure. The residue is treated with isopropyl ether, whereupon 7-chloro-2-(α-ethoxyethylidene)amino - 5 - (p-methoxyphenyl)-3H-1,4-benzodiazepine is obtained as crystals. Recrystallization from isopropyl ether gives colorless plates, melting at 142°–143° C.

*Elementary analysis.*—Calcd. for $C_{20}H_{20}ClN_3O_2$ (percent): C, 64.95; H, 5.45; N, 11.36. Found (percent): C, 64.81; H, 5.46; N, 11.39.

EXAMPLE 10

To a solution of 3 parts of 2-amino-7-chloro-5-(p-methoxyphenyl)-3H-1,4-benzodiazepine in 50 parts (by volume) of xylene, are added 2.4 parts of ethyl orthoacetate and 1.1 part of calcium chloride. The mixture is refluxed for 1.5 hour. After cooling, calcium chloride is removed by filtration and the filtrate is concentrated to dryness under reduced pressure. The residue is treated with isopropyl ether, whereupon 7-chloro-2-(α-ethoxyethylideneamino) - 5 - (p-methoxyphenyl)-3H-1,4-benzodiazepine is obtained as crystals. Recrystallization from isopropyl ether gives colorless plates, melting at 142°–143° C.

This product is identical with the product obtained in Example 9.

EXAMPLE 11

3.7 parts of 7-choro-2-(α-ethoxyethylidene) amino-5-(p-methoxyphenyl)-3H - 1,4 - benzodiazepine prepared in Example 9 or 10 are added to 100 parts (by volume) of 15% ammoniacal ethanol. After stirring for 40 minutes and then distilling off the solvent, the residue is treated with ether, whereupon 2-acetoamidino-7-chloro-5-(p-methoxyphenyl)-3H-1,4-benzodiazepine is obtained as crystals. Recrystallization from acetone gives colorless flakes, melting at 136°–138° C.

EXAMPLE 12

To a solution of 3.4 parts of 2-acetoamidino-7-chloro-5-(p-methoxyphenyl)-3H-1,4-benzodiazepine prepared in Example 11 in 10 parts (by volume) of methanol are added dropwise 20 parts (by volume) of an aqueous sodium hypochlorite solution (1.75 mole concentration). The mixture is stirred for about 10 minutes, followed by the distillation of methanol. The residue is admixed with water and extracted with ethyl acetate. The ethyl acetate layer is washed with water and dried over anhydrous sodium sulfate. The solvent is removed by distillation and the residue is treated with isopropyl ether to give 8-chloro-2-methyl - 6 - (p-methoxyphenyl)-4H-s-triazolo[1,5-a][1,4]benzodiazepine as crystals. Recrystallization from ether ether gives colorless needles, melting at 148°–149° C.

*Elementary analysis.*—Calcd. for $C_{18}H_{15}ClN_4O$ (percent): C, 63.81; H, 4.46; N, 16.54. Found (percent): C, 63.81; H, 4.30; N, 16.88.

EXAMPLE 13

A mixture of 2.86 parts of 2-amino-7-chloro-5-phenyl-3H-1,4-benzodiazepine 4N-oxide and 16 parts of ethyl orthoacetate is heated at 150°–160° C. for about 7 minutes, followed by distillation of the solvent under reduced pressure. The residue is dissolved in 100 parts (by volume) of 15% ammoniacal ethanol under ice-cooling, and the solution is kept standing for about 15 minutes. After the reaction is finished, ethanol is distilled off under reduced pressure. The residue is treated with ethyl acetate, whereupon 2-acetoamidino-7-chloro-5-phenyl-3H-1,4-benzodiazepine 4N-oxide is obtained as crystals. Recrystallization from ethyl acetate gives colorless needles melting at 181°–182° C.

*Elementary analysis.*—Calcd. for $C_{17}H_{15}ClN_4O$ (percent): C, 62.48; H, 4.63; N, 17.15. Found (percent): C, 62.48; H, 4.58; N, 17.48.

EXAMPLE 14

To a solution of 3.27 parts of 2-acetoamidino-7-chloro-5-phenyl-3H-1,4-benzodiazepine 4N-oxide prepared in Example 13 in 100 parts (by volume) of methanol are added dropwise 20 parts (by volume) of an aqueous sodium hypochlorite solution (1.75 mole concentration). After about 15 minutes, methanol is distilled off under reduced pressure, followed by addition of water. The mixture is extracted with chloroform. Chloroform layer is washed with water and dried over anhydrous sodium sulfate, and then the solvent is distilled off. The residue is treated with ethyl ether, whereupon 8-chloro-2-methyl-6-phenyl-4H-s-triazolo-[1,5-a][1,4]-benzodiazepine 5N-oxide is obtained as crystals. Recrystallization from acetone gives colorless prisms, melting at 220°–221° C.

*Elementary analysis.*—Calcd. for $C_{17}H_{13}ClN_4O$ (percent): C, 62.87; H, 4.03; N, 17.25. Found (percent): C, 63.09; H, 3.91; N, 17.43.

EXAMPLE 15

To a solution of 1.62 parts of 8-chloro-2-methyl-6-phenyl-4H-s-triazolo[1,5-a][1,4]benzodiazepine 5N-oxide in 100 parts (by volume) of chloroform is added 0.9 part (by volume) of phosphorus trichloride. After refluxing for 3 hours, the solution is neutralized with saturated aqueous sodium bicarbonate solution. Chloroform layer is washed with water and dried over anhydrous sodium sulfate and the solvent is distilled off. Treatment of the residue with isopropyl ether gives 8-chloro-2-methyl-6-phenyl-4H-s-triazolo[1,5 - a][1,4] - benzodiazepine as crystals. Recrystallization from ethyl ether gives colorless prisms, melting at 167–169° C.

This product is identical with the product obtained in Examples 2 and 3.

What is claimed is:
1. A member selected from the group consisting of a compound of the formula

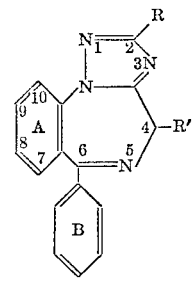

wherein R is alkyl of up to 8 carbon atoms, cycloalkyl of up to 8 carbon atoms, phenyl, naphthyl or phenyl lower alkyl, R' is hydrogen or lower alkyl and rings A and B independently are unsubstituted or substituted by one or more members of the group consisting of halogen, nitro, trifluoromethyl, alkyl of up to 6 carbon atoms, cycloalkyl of up to 6 carbon atoms and alkoxy of up to 4 carbon atoms, a corresponding 5N-oxide thereof and a pharmaceutically acceptable acid salt thereof.

2. A compound according to claim 1, wherein R is methyl.

3. A compound according to claim 1, wherein R is ethyl.

4. A compound according to claim 1, namely, 8-chloro-2-methyl-6-phenyl-4H - s - triazolo[1,5-a][1,4]benzodiazepine.

5. A compound according to claim 1, namely, 8-chloro-2-methyl - 6 - phenyl-4H-s-triazolo[1,5-a][1,4]benzodiazepine picrate.

6. A compound according to claim 1, namely, 8-chloro-2-ethyl - 6 - phenyl-4H-s-triazolo[1,5-a][1,4]benzodiazepine.

7. A compound according to claim 1, namely, 8-chloro-2-methyl - 6 - (p-methoxyphenyl)-4H-s-triazolo[1,5-a][1,4]benzodiazepine.

8. A compound according to claim 1, namely, 8-chloro-2-methyl-6-phenyl - 4H - s - triazolo[1,5-a][1,4]benzodiazepin 5N-oxide.

9. A compound according to claim 1, namely, 2-methyl-8-nitro - 6 - phenyl-4H-s-triazolo[1,5-a][1,4]benzodiazepine.

References Cited

Meguro et al., Tetrahedron Letters No. 47, pp. 4039–4042 (1970).

AITON D. ROLLINS, Primary Examiner

U.S. Cl. X.R.

260—239 BD; 424—244, 269